July 18, 1933.    J. H. WETZEL    1,919,142
AIRCRAFT
Filed Aug. 16, 1932

WITNESSES
Edw. Thorpe
Hugh H. Ott

INVENTOR
Joseph H. Wetzel
BY Munn &Co.
ATTORNEY

Patented July 18, 1933

1,919,142

UNITED STATES PATENT OFFICE

JOSEPH H. WETZEL, OF TRENTON, NEW JERSEY

AIRCRAFT

Application filed August 16, 1932. Serial No. 629,069.

This invention relates generally to the class of aircraft, and comprehends an improvement in that type of aircraft which is driven or propelled by an internal combustion motor and which includes an air foil.

The invention broadly aims to provide means connected with the aircraft motor for receiving, conveying away and discharging the exhaust thereof into the region of greatest negative pressure developed at the surface of the air foil, whereby the noise incident to the combustion of the motor is muffled or silenced, back pressure on the motor is eliminated, the air foil boundary layer reduced and the heating of the adjacent wing area is effected to prevent the formation of ice thereon.

The invention further resides in a means of the indicated character which is comparatively simple in its construction, inexpensive to produce and incorporate in an aircraft during its course of construction or to install in those which have been previously built, and which means is highly efficient for the purposes set forth.

With the above recited and other objects in view, reference is had to the following description and accompanying drawing, in which there is exhibited one example or embodiment of the invention, while the claims define the actual scope of the same.

Figure 1:
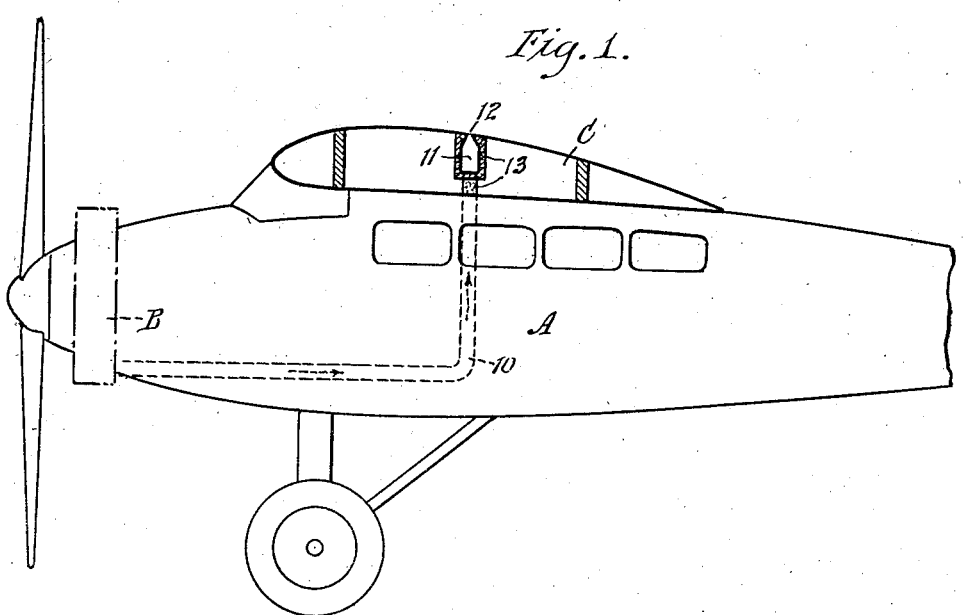
Figure 1 is a diagrammatic side view of an airplane, parts being shown in section and illustrating the same equipped with improved means constructed in accordance with the invention.
Figure 2:
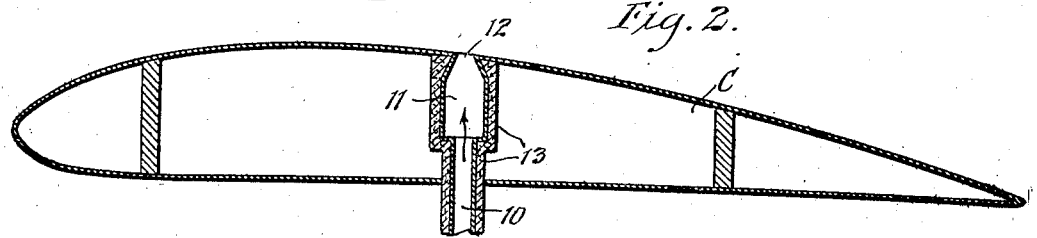
Figure 2 is an enlarged detail sectional view illustrating particularly the outlet end of the exhaust device.
Figure 3:
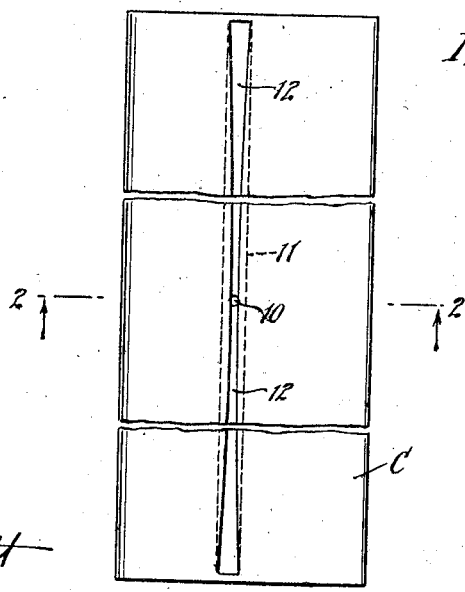
Figure 3 is a plan view on a reduced scale, more particularly illustrating the exhaust outlet.

Referring to the drawing by characters of reference, the improved exhaust device constituting the present invention is illustrated as applied to an airplane, although it is to be understood that the invention is not necessarily restricted to use on this type of aircraft but is applicable to any aircraft which employs an internal combustion motor as its means of propulsion and which includes an air foil. In the drawing, A designates the body of the fuselage of an airplane, B the motor, and C the wing or air foil. The invention consists of a pipe or other conduit 10 which leads from the exhaust of the motor B to a suitable outlet duct 11 located within the structure of the wing or air foil C and having an outlet 12 opening through the surface of the air foil at the region of greatest negative pressure developed by the air foil during its passage through the air. As particularly illustrated in the application of the invention selected for the purposes of illustration, the outlet 12 is in the upper camber of the wing, and said outlet is constricted adjacent the central portion or the portion located nearest the communication of the conduit 10 with the duct 11, said outlet gradually increasing in size from said point to the remote point or points, whereby the discharge is more uniformly distributed over the outlet 12. In order to protect the parts of the aircraft through which it extends from the heat of the exhaust, both the conduit 10 and outlet duct 11 are covered with suitable heat insulating material 13.

In use and operation, it will be found that when the craft is in motion, the region of greatest negative pressure developed by the air foil surface creates a suction which aids in the drawing off of the exhaust from the motor so as to muffle or silence the noise of the combustion and at the same time eliminate back pressure while effectively reducing the air foil boundary layer. The exhaust device further tends to preclude the formation of ice in the wing area adjacent the outlet 12, due to the heat of the exhaust dissipated in this region. Obviously, the device may be inexpensively incorporated in any new construction and may likewise be installed in previously built aircraft without materially altering the structure thereof.

While there has been illustrated and described a preferred embodiment of the invention, this is not intended as a limitation upon the scope of the same, and it is to be understood that variations and modifications which fall within the range of the claims may be resorted to when desired.

What is claimed is:

1. In combination, an aircraft having an air foil, an internal combustion motor and means for receiving, conveying away and discharging the motor exhaust into the region of greatest negative pressure developed at the surface of the air foil when the craft is in motion, said means comprising a conduit having an inlet end connected and communicating with the motor exhaust manifold and an outlet duct at the opposite end of the conduit opening through the surface of the air foil at said region of greatest negative pressure, said outlet duct having a discharge slot of increasing size from the region adjacent its communication with the conduit to its region remote therefrom.

2. In combination, an aircraft having an air foil, an internal combustion motor and means for receiving, conveying away and discharging the motor exhaust, which means includes a conduit connected with and leading from the motor exhaust manifold and an outlet duct at the opposite end of the conduit opening through a surface of the air foil, said outlet duct having a discharge slot of increasing size from the region adjacent its point of communication with the conduit to the region remote therefrom.

JOSEPH H. WETZEL.